US012784998B2

(12) United States Patent
Choi et al.

(10) Patent No.: US 12,784,998 B2
(45) Date of Patent: Nov. 3, 2026

(54) COMPOSITE IN WHICH DEFECT-INDUCED CARBON BODY AND METAL OXIDE ARE COUPLED, METHOD FOR PRODUCING COMPOSITE IN WHICH DEFECT-INDUCED CARBON BODY AND METAL OXIDE ARE COUPLED, AND ENERGY STORAGE DEVICE INCLUDING COMPOSITE ELECTRODE IN WHICH DEFECT-INDUCED CARBON BODY AND METAL OXIDE ARE COUPLED

(71) Applicant: KOREA UNIVERSITY RESEARCH AND BUSINESS FOUNDATION, Seoul (KR)

(72) Inventors: Wonjoon Choi, Seoul (KR); Kyeong min Kim, Bucheon-si (KR); Byung-Seok Seo, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 143 days.

(21) Appl. No.: 18/724,328

(22) PCT Filed: Nov. 21, 2022

(86) PCT No.: PCT/KR2022/018396
§ 371 (c)(1),
(2) Date: Jun. 26, 2024

(87) PCT Pub. No.: WO2023/146088
PCT Pub. Date: Aug. 3, 2023

(65) Prior Publication Data

US 2025/0062079 A1 Feb. 20, 2025

(30) Foreign Application Priority Data

Jan. 27, 2022 (KR) ........................ 10-2022-0011997

(51) Int. Cl.
*H01G 11/24* (2013.01)
*H01G 11/26* (2013.01)
(Continued)

(52) U.S. Cl.
CPC ............. *H01G 11/24* (2013.01); *H01G 11/26* (2013.01); *H01G 11/32* (2013.01); *H01G 11/46* (2013.01); *H01G 11/86* (2013.01)

(58) Field of Classification Search
CPC ........ H01G 11/24; H01G 11/32; H01G 11/46; H01G 11/86; H10G 11/26
(Continued)

(56) References Cited

U.S. PATENT DOCUMENTS 9,149,833 B2 * 10/2015 Ramaprabhu ............ B05D 3/06
2010/0181200 A1 * 7/2010 Yang ...................... B82Y 40/00 427/113
2013/0130049 A1 * 5/2013 Moilanen .................. C08L 1/02 252/62.51 R

FOREIGN PATENT DOCUMENTS

CN 105161313 B * 12/2017
JP 2009-76514 A 4/2009
(Continued)

OTHER PUBLICATIONS

International Search Report issued on Apr. 13, 2023 for corresponding International Patent Application No. PCT/KR2022/018396, along with an English translation (7 pages).
(Continued)

*Primary Examiner* — Arun Ramaswamy
(74) *Attorney, Agent, or Firm* — Hauptman Ham, LLP

(57) ABSTRACT

A composite according to an embodiment of the present invention is characterized by including a defect-induced carbon body and a metal oxide coupled to the carbon body. The composite according to an embodiment of the present
(Continued)

invention induces defects in the carbon body, thereby improving interfacial properties between the carbon body and the metal oxide, and has an increased contact area, thereby improving electrochemical properties of the composite.

10 Claims, 13 Drawing Sheets

(51) Int. Cl.

| | |
|---|---|
| ***H01G 11/32*** | (2013.01) |
| ***H01G 11/46*** | (2013.01) |
| ***H01G 11/86*** | (2013.01) |

(58) Field of Classification Search

USPC .................................................. 361/502, 503

See application file for complete search history.

(56) References Cited

FOREIGN PATENT DOCUMENTS

| | | | |
|---|---|---|---|
| KR | 10-2009-0117602 | A | 11/2009 |
| KR | 10-2016-0093230 | A | 8/2016 |

OTHER PUBLICATIONS

Written Opinion issued on Apr. 13, 2023 for corresponding International Patent Application No. PCT/KR2022/018396 (3 pages).

Yang, Guijun et al., "Facile hydrothermal synthesis of NiCo2O4-decorated filter carbon as electrodes for high performance asymmetric supercapacitors", Electrochimica Acta, vol. 285, Aug. 20, 2018, pp. 405-414, https://www.sciencedirect.com/science/article/pii/S001346861831781X, Cited in NPL Nos. 1 and 2.

Kang, Jin Gu et al., "Joule Heating-Induced Carbon Fibers for Flexible Fiber Supercapacitor Electrodes", Materials, vol. 13, 5255, Nov. 20, 2020, 10 Pages, https://www.mdpi.com/1996-1944/13/22/5255, Cited in NPL Nos. 1 and 2.

* cited by examiner

COMPOSITE IN WHICH DEFECT-INDUCED CARBON BODY AND METAL OXIDE ARE COUPLED, METHOD FOR PRODUCING COMPOSITE IN WHICH DEFECT-INDUCED CARBON BODY AND METAL OXIDE ARE COUPLED, AND ENERGY STORAGE DEVICE INCLUDING COMPOSITE ELECTRODE IN WHICH DEFECT-INDUCED CARBON BODY AND METAL OXIDE ARE COUPLED

CROSS-REFERENCE TO RELATED APPLICATION

This application is a National Stage of International Application No. PCT/KR2022/018396, filed on Nov. 21, 2022, which is based upon and claims the benefit of priority to Korean Patent Application No. 10-2022-0011997, filed on Jan. 27, 2022, in the Korean Intellectual Property Office. All of the aforementioned applications are hereby incorporated by reference in their entireties.

TECHNICAL FIELD

The present invention relates to a composite in which a defect-induced carbon body and a metal oxide are coupled, a method for producing a composite in which a defect-induced carbon body and a metal oxide are coupled, and an energy storage device including a composite electrode in which a defect-induced carbon body and a metal oxide are coupled.

BACKGROUND ART

Recently, interest in technology has moved beyond small mobile devices such as smartphones and tablets to large mobile devices such as electric vehicles, self-driving cars, and self-generated IoT systems.

As interest in such mobile devices has increased, research and development on energy storage systems (ESS) is also actively conducted. An example of energy storage systems includes a battery, a supercapacitor, or the like.

Among these, the supercapacitor is an energy storage device that uses adsorption and desorption reactions of physical ions.

In general, a supercapacitor is composed of an activated carbon electrode that physically adsorbs and desorbs ions, a cellulose-based porous separator that separates the ions, a current collector that serves as a passage for the flow of charges, and an electrolyte that provides a charge carrier.

An element that has the greatest impact on the performance of a supercapacitor is a carbon electrode material, which requires a large specific surface area, chemical resistance, a low thermal expansion rate, and high electrical conductivity to increase the performance of the supercapacitor.

DISCLOSURE OF THE INVENTION

Technical Problem

The present invention provides a composite with improved electrochemical properties in which a carbon body and a metal oxide are coupled, and a method for producing the composite.

The present invention also provides an energy storage device including, as an electrode, a composite with improved electrochemical properties in which a carbon body and a metal oxide are coupled.

Meanwhile, other objects of the present invention that are not specified will be further considered within the scope that can be easily derived from the following detailed description and the effects thereof.

Technical Solution

In order to achieve the objectives proposed above, the following solution means are proposed.

In accordance with an exemplary embodiment of the present invention, there is provided a composite including a defect-induced carbon body and a metal oxide coupled to the carbon body.

In an embodiment, the metal oxide may be a nickel-cobalt oxide.

In an embodiment, the metal oxide may be $NiCo_2O_4$.

In an embodiment, in the carbon body, the contact angle of a precursor solvent of the metal oxide with respect to the surface of the carbon body may be about 25 degrees to about 35 degrees due to the induced defect.

In an embodiment, the carbon body may have a dimple or spherical protrusion formed on the surface thereof.

In an embodiment, the metal oxide may be coupled in the form of a protrusion formed by aggregation of a plurality of particle phases on the surface of the carbon body.

In accordance with another embodiment of the present invention, an energy storage device includes, as an electrode, a composite including a defect-induced carbon body and a metal oxide coupled to the carbon body.

In accordance with yet another embodiment of the present invention, a method for producing a composite is a method for producing a composite including a defect-induced carbon body and a metal oxide coupled to the carbon body, and includes the steps of: (a) inducing defects in a carbon body through a Joule-heating process; (b) contacting the defect-induced carbon body with a solution containing a metal oxide precursor; and (c) applying heat to the carbon body in contact with the metal oxide precursor to decompose the precursor, and synthesizing a metal oxide.

In another embodiment, the Joule-heating process of the step (a) may be performed by applying a current of about 260 $J/cm^2$ to about 780 $J/cm^2$ to the carbon body.

In another embodiment, the metal oxide precursor solution may be a solution in that a nickel nitrate and a cobalt nitrate are dissolved in a solvent.

In another embodiment, the step (c) may be performed by a Joule-heating process, and performed by flowing a current of about 25 $J/cm^2$ to about 50 $J/cm^2$ for about 0.3 seconds to about 1 second.

Effects of the Invention

A composite according to an embodiment of the present invention induces defects in a carbon body, thereby improving interfacial properties between the carbon body and a metal oxide, and has an increased contact area, thereby improving electrochemical properties of the composite.

Therefore, by using a composite in which a defect-induced carbon body and a metal oxide are coupled, such as a supercapacitor, as an electrode for an energy storage device, the performance of the energy storage device is improved.

Meanwhile, a method for producing a composite according to another embodiment of the present invention enables the synthesis of the composite within a few seconds through a Joule-heating process, and thus, may significantly reduce the production time and production cost.

Although not explicitly stated herein, it should be understood that effects described in the following specification that are expected by the technical features of the present invention and their provisional effects are treated as described in the specification of the present invention.

The accompanying drawings are exemplified by reference for an understanding of the technical idea of the present invention, and the scope of the present invention is not limited thereto.

MODE FOR CARRYING OUT THE INVENTION

Hereinafter, with reference to the drawings, the configuration of the present invention guided by various embodiments of the present invention, and effects resulting from the configuration will be described. In describing the present invention, detailed descriptions of related known functions will be omitted when it is determined that the detailed descriptions may unnecessarily obscure the gist of the present invention that is apparent to those skilled in the art.

A composite of the present invention includes a defect-induced carbon body and a metal oxide coupled to the carbon body.

Defects induced in the carbon body is caused by an artificial process.

That is, sudden thermal energy is applied to the carbon body through the Electrothermal Waves (ETW) process to induce defects, and the induced defects adjust the contact angle and nucleation rate of a metal oxide precursor solution with respect to the surface of the carbon body.

The microstructure and chemical composition of the metal oxide are controlled by the defects induced in the carbon body.

If the above-described composite of the present invention is used as an energy storage device, the performance is improved.

For example, if the composite of the present invention is used as an electrode of a supercapacitor, the supercapacitor is confirmed to have a capacitance retention rate improved by about 60% or greater, have a high specific capacitance of about 1925 F/g at a scan rate of about 1 mV/s, and exhibits high durability in a long-term maintenance test of 28,000 cycles.

Meanwhile, a method for producing a composite according to another embodiment of the present invention enables the synthesis of the composite within a few seconds through a Joule-heating process, and thus, has the advantage of significantly reducing the production time and production cost.

Hereinafter, embodiments and effects thereof will be described in detail with reference to the production method.

Figure 1:
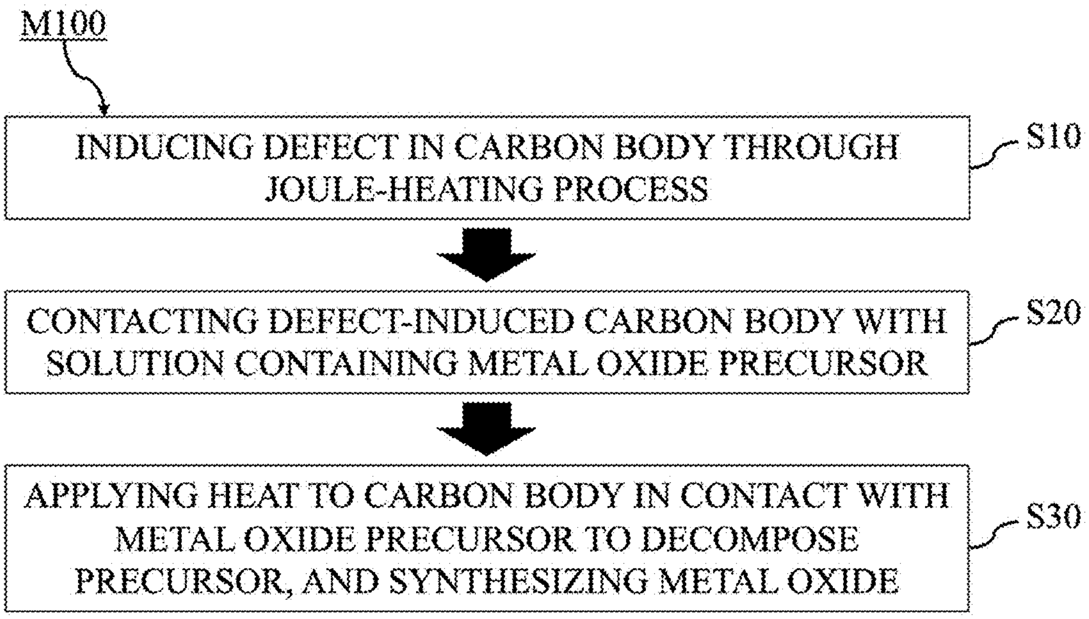
FIG. 1 is a schematic flowchart of a method for producing a composite in accordance with an exemplary embodiment of the present invention.
Figure 2:
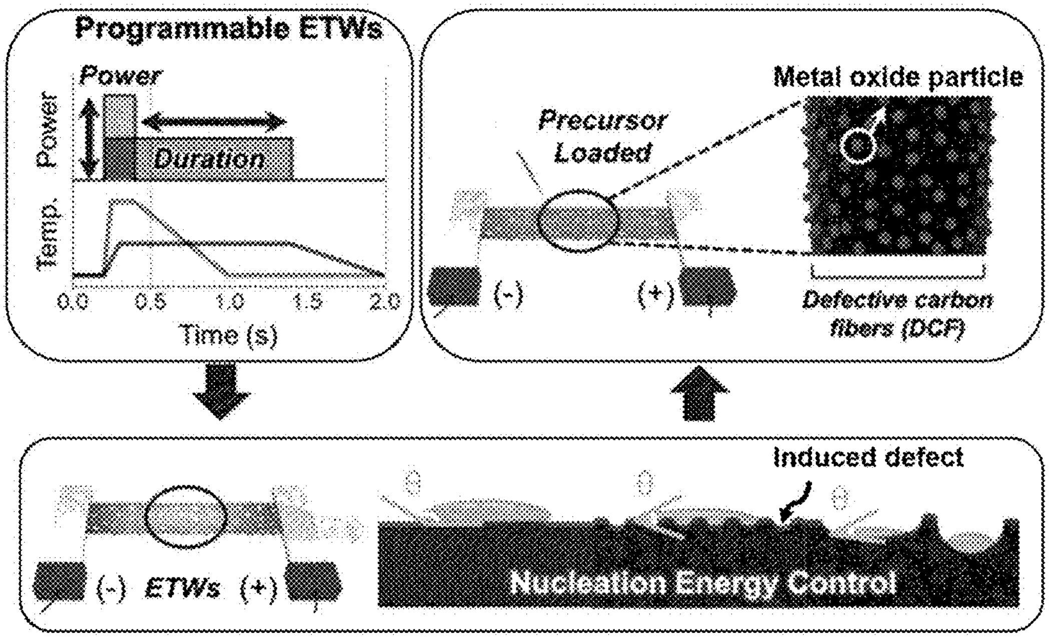
FIG. 2 is a schematic diagram of a method for producing a composite in accordance with an exemplary embodiment of the present invention.
Figure 3:
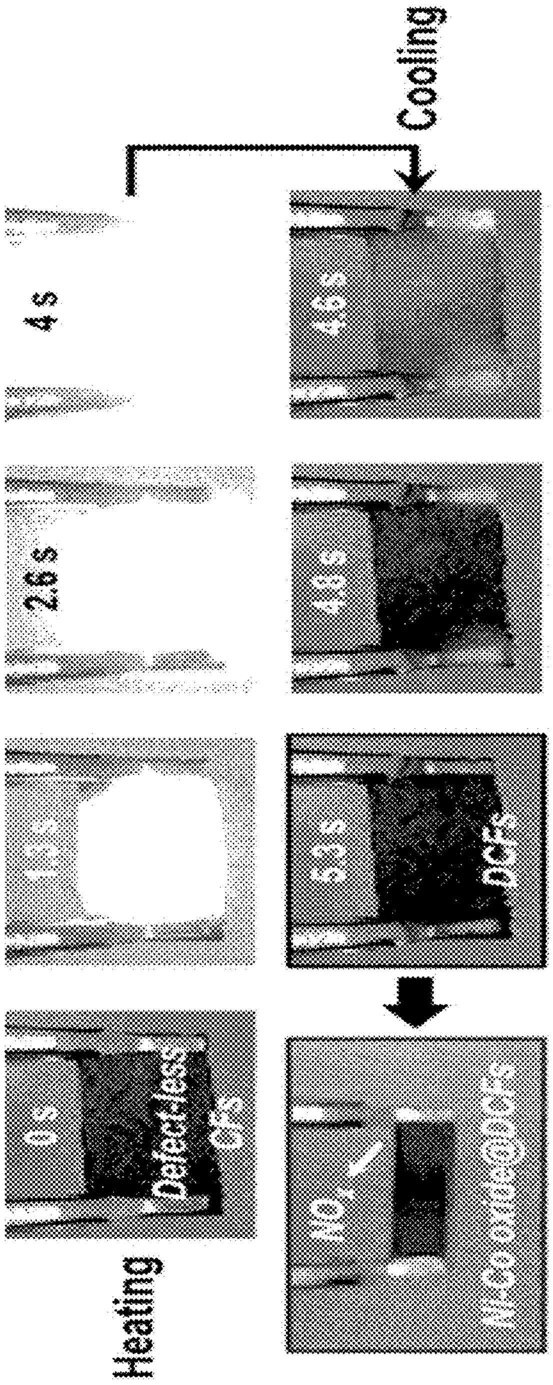
FIG. 3 is an image obtained by photographing a process of a method for producing a composite in accordance with an exemplary embodiment of the present invention.

FIG. 1 is a schematic flowchart of a method for producing a composite in accordance with an exemplary embodiment of the present invention, FIG. 2 is a schematic diagram of a method for producing a composite in accordance with an exemplary embodiment of the present invention, and FIG. 3 is an image obtained by photographing a process of a method for producing a composite in accordance with an exemplary embodiment of the present invention.

Hereinafter, with reference to FIGS. 1 to 3, a production method M100 of a composite in accordance with an exemplary embodiment of the present invention will be described.

The production method M100 of a composite in accordance with an exemplary embodiment of the present invention includes S10 inducing defects in a carbon body through a Joule-heating process, S20 contacting the defect-induced carbon body with a solution containing a metal oxide precursor, and S30 applying heat to the carbon body in contact with the metal oxide precursor to decompose the precursor, and synthesizing a metal oxide.

1. S10 Inducing Defect in Carbon Body Through Joule-Heating Process

As a carbon body, a carbon material such as carbon fiber, graphene, and activated carbon may be used.

The carbon material may be used in the form of a sheet, but the present invention is not limited thereto.

Defects are induced in the prepared carbon body through a Joule-heating process.

That is, electrodes for applying electricity are connected to both ends of the prepared carbon body and then electricity is applied thereto.

The energy density of the electricity applied to induce defects in the carbon body may be controlled to be about 260 $J/cm^2$ and to about 780 $J/cm^2$.

If the energy density of the applied electricity is less than about 260 $J/cm^2$, there is a lack of induced defects, and if greater than about 780 $J/cm^2$, the microstructure and chemical properties of a metal oxide are degraded due to excessive defects.

2. S20 Contacting Defect-Induced Carbon Body with Solution Containing Metal Oxide Precursor As a metal oxide, a nickel-cobalt oxide was used. However, the present invention is not limited thereto, and it may be possible to use other types of metal oxides.

A metal oxide precursor solution for forming a composite is prepared. A solution in which a metal oxide precursor is dissolved in a solvent may be used. If the metal oxide is the nickel-cobalt oxide, a Ni nitrate hexahydrate and a Co nitrate hexahydrate may be dissolved in an acetone solvent and prepared.

The prepared metal oxide precursor solution may be brought into contact with the defect-induced carbon body. Bringing the metal oxide precursor solution into contact with the defect-induced carbon body may be performed by dip-coating, spin-coating, spray-coating, or drop-casting.

The metal oxide precursor solution is brought into contact with the defect-induced carbon body, and then may be dried for a predetermined period of time.

3. S30 Applying Heat to Carbon Body in Contact with Metal Oxide Precursor to Decompose Precursor, and Synthesizing Metal Oxide The present step may be performed by a Joule-heating process in which heat is applied to the carbon body in contact with the metal oxide precursor.

For example, electrodes are connected to both ends of the carbon body in contact with the metal oxide precursor and then electricity is applied thereto.

At this time, the applied electricity may have an energy density of about 25 $J/cm^2$ to about 50 $J/cm^2$.

The precursor is decomposed by heat generated by the application of electricity described above, and reaches a temperature at which the precursor is synthesized into an oxide.

Through the step S30, a composite in which the metal layer is coupled to a carbon fiber sheet is produced.

EXAMPLE

As a carbon body, a carbon fiber (CF) sheet (WizMac, HCP030, hydrophilic, 300 μm thick, Korea) was prepared.

The prepared carbon fiber sheet was cut into 2 cm×1 cm to induce defects through a Joule-heating process. The size of the carbon fiber sheet is for experimental purposes only, and the present invention is not limited thereto.

Electrical clamps were connected to both ends of the cut carbon fiber sheet, and a programmable DC power supply (Unicorn TMI, Udp-3050, Korea) was used to apply electricity to perform the Joule-heating process. The application time was controlled to be 0 s, 2 s, 4 s, 6 s, and 8 s. That is, the input energy density was controlled to be 0, 260 $J/cm^2$, 520 $J/cm^2$, 780 $J/cm^2$, and 1,040 $J/cm^2$ (DC Power: 260 W=13 V×20 A), and the cooling time was set to 10 seconds at room temperature.

The carbon fiber sheet was once again cut into 2 cm×0.5 cm to couple a metal oxide.

Specifically, 0.33 M of a Ni nitrate hexahydrate ($Ni(NO_3)_2 \cdot 6H_2O$, DAEJUNG, Mn~290.79, ≥97% Korea) and 0.66M of a Co nitrate hexahydrate ($Co(NO_3)_2 \cdot 6H_2O$, Mn~291.03, ≥98%, Sigma-Aldrich) were dissolved in 1 M of an acetone solvent to prepare a metal oxide precursor solution.

The prepared metal oxide precursor solution was mixed for about 10 minutes using an ultrasonic treatment device. 2 μl of the metal oxide precursor solution was loaded onto the carbon fiber sheet by the drop-casting method to be brought into contact with the sheet.

Thereafter, the carbon fiber sheet was dried for 6 hours at room temperature.

Electricity was applied to the carbon fiber sheet in contact with the metal oxide precursor solution through electrical clamps at both ends of the sheet.

65 W (6.5 V×10 A) of electricity was applied to the carbon fiber sheet in contact with the metal oxide precursor solution for 0.5 s to produce a composite in which a nickel-cobalt oxide is coupled to the carbon fiber sheet.

Experimental Examples

Properties of the composite of Example described above were evaluated.

1. Examination of Physicochemical Properties

The surface shape of the composite was examined by a field emission scanning electron microscope (SEM; FEI, Model Quanta 250 FEG; Jeol, Model JSM-6701F), and the particle size was measured using Image J software.

The chemical composition of the complex was analyzed by X-ray photoelectron spectroscopy (XPS; Ulvac-phi, X-tool) and X-ray diffraction (XRD; Rigaku, SmartLab), and the elemental distribution was measured by energy dispersive X-ray spectroscopy (EDX; FEI, Tecnai G2 F30ST), and chemical reactions were measured using thermogravimetric analysis (TGA, TA instrument, SDTQ600/DSCQ20 System, USA).

The contact angle of the metal oxide precursor solution with respect to the carbon body was measured using a microscope (Macro 105 mm, f/2.8D, Nikon).

2. Evaluation of Electrochemical Performance of Composite as Supercapacitor Electrode The composite was used as an electrode of a half-cell supercapacitor (three-electrode method).

The electrochemical performance of the half-cell supercapacitor including the composite as an electrode was examined using a potentiostat/galvanostat (Gamry Instruments Interface 1000E), including cyclic voltammetry (CV), electrochemical impedance spectroscopy (EIS), and galvanostatic charge-discharge (GCD).

A reference electrode and a counter electrode of the half-cell supercapacitor were Hg/HgO and a Pt wire, and a potassium hydroxide (KOH) aqueous solution (5.5 M) was used as an electrolyte.

The scan rate of the CV test was controlled from 1 mV/s to 100 mV/s in a potential window of 0.5 V.

The frequency range of the EIS analysis was set from 10-1 Hz to 105 Hz.

The electrical resistance was measured using a digital multimeter (Fluke 1557).

3. Results

Defects induced in the carbon body are formed by the Joule-heating process, and are mainly induced by the oxidation of carbon on the surface of the carbon body.

Such defects induced in the carbon body affect the crystal size and particle distribution of a metal oxide coupled to the carbon body. That is, the contact angle and nucleation energy of the metal oxide precursor solution with respect to the carbon body are adjusted.

Meanwhile, when measured, the average temperature at the time of applying electricity through the electrical clamps at both ends of the carbon fiber sheet in contact with the metal oxide precursor solution increased to 598° C. within 0.67 seconds, and the thermogravimetric analysis of the composite showed no residual nitrate. That is, the metal oxide precursor in the carbon fiber sheet in contact with the metal oxide precursor solution was completely decomposed and converted into a metal oxide.

The metal oxide produced in Example was a Ni—Co spinel crystal ($NiCo_2O_4$).

Figure 4:
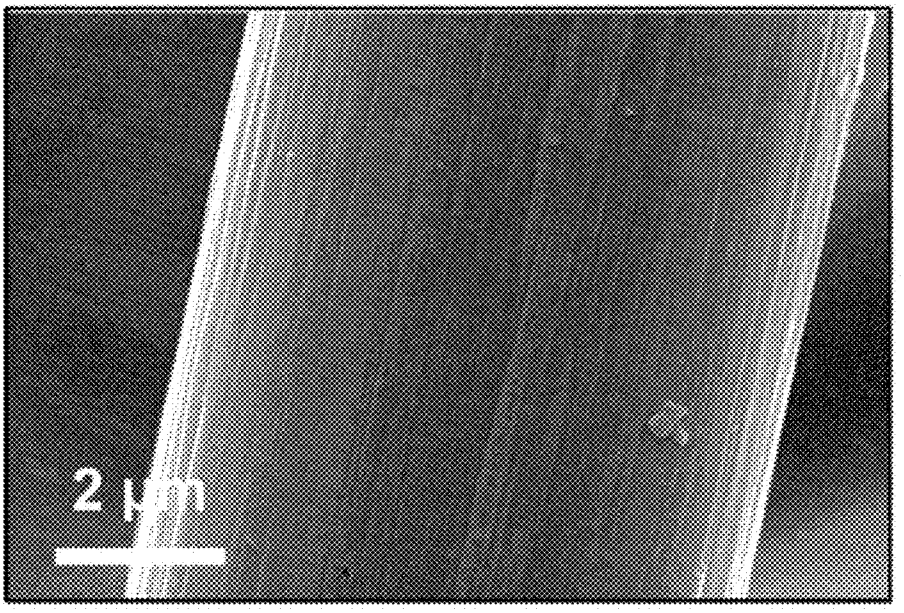
FIG. 4 is an SEM image of the surface of a carbon body before inducing defects.
Figure 5:
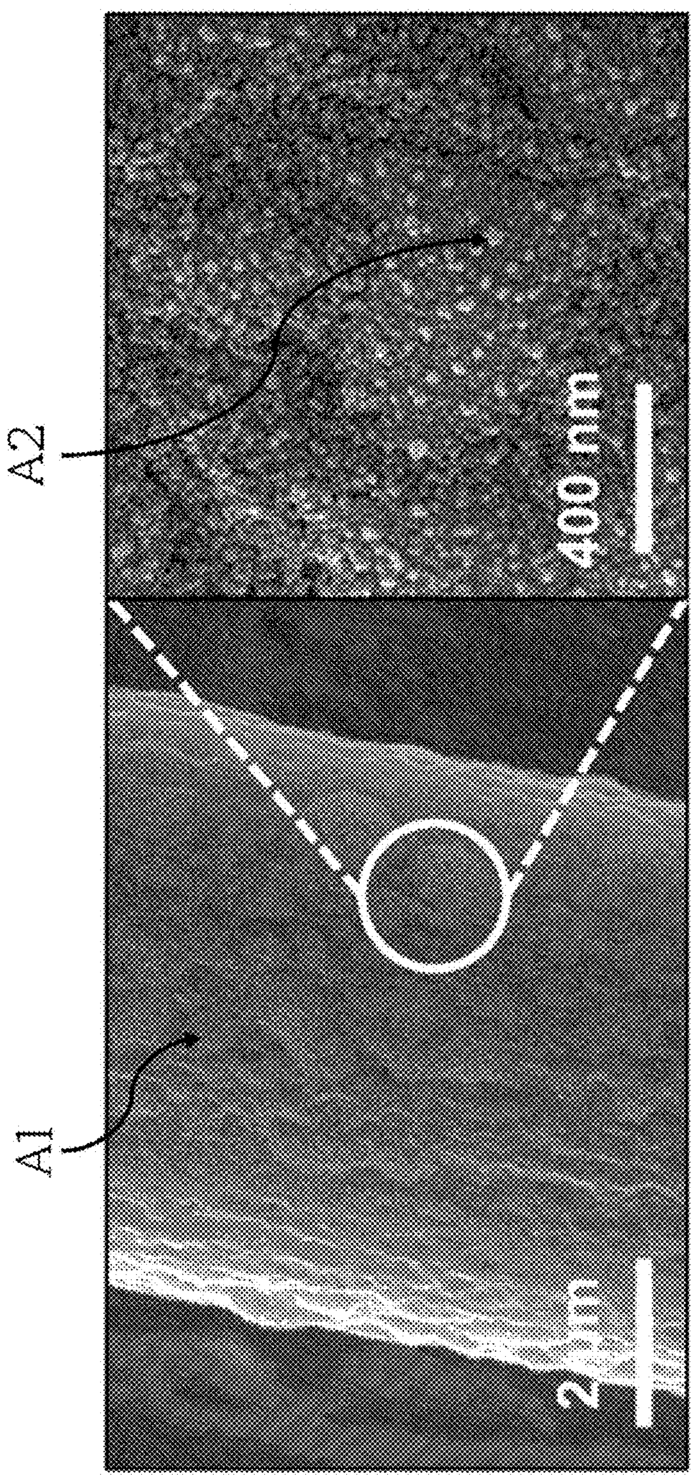
FIG. 5 is an SEM image of the surface of a composite in accordance with an exemplary embodiment of the present invention.

FIG. 4 is an SEM image of the surface of a carbon body before inducing defects, and FIG. 5 is an SEM image of the surface of a composite in accordance with an exemplary embodiment of the present invention.

Referring to FIG. 4, it can be confirmed that the surface of the carbon body is smooth before defects are induced. However, as can be seen in FIG. 5, a dimple A1 or spherical protrusion A2 is formed on the surface of the carbon body with an induced defect, which increases the surface area of the carbon body. In addition, it can be confirmed that the metal oxide coupled to the surface of the carbon body is formed into the protrusion A2 formed by aggregation of a plurality of particle phases.

The metal oxide serves an active material for electrochemical energy conversion in an energy storage device such as a supercapacitor, and the defect-induced carbon body provides an additional conductive path to a charge carrier along the interface between the active materials.

Figure 6:
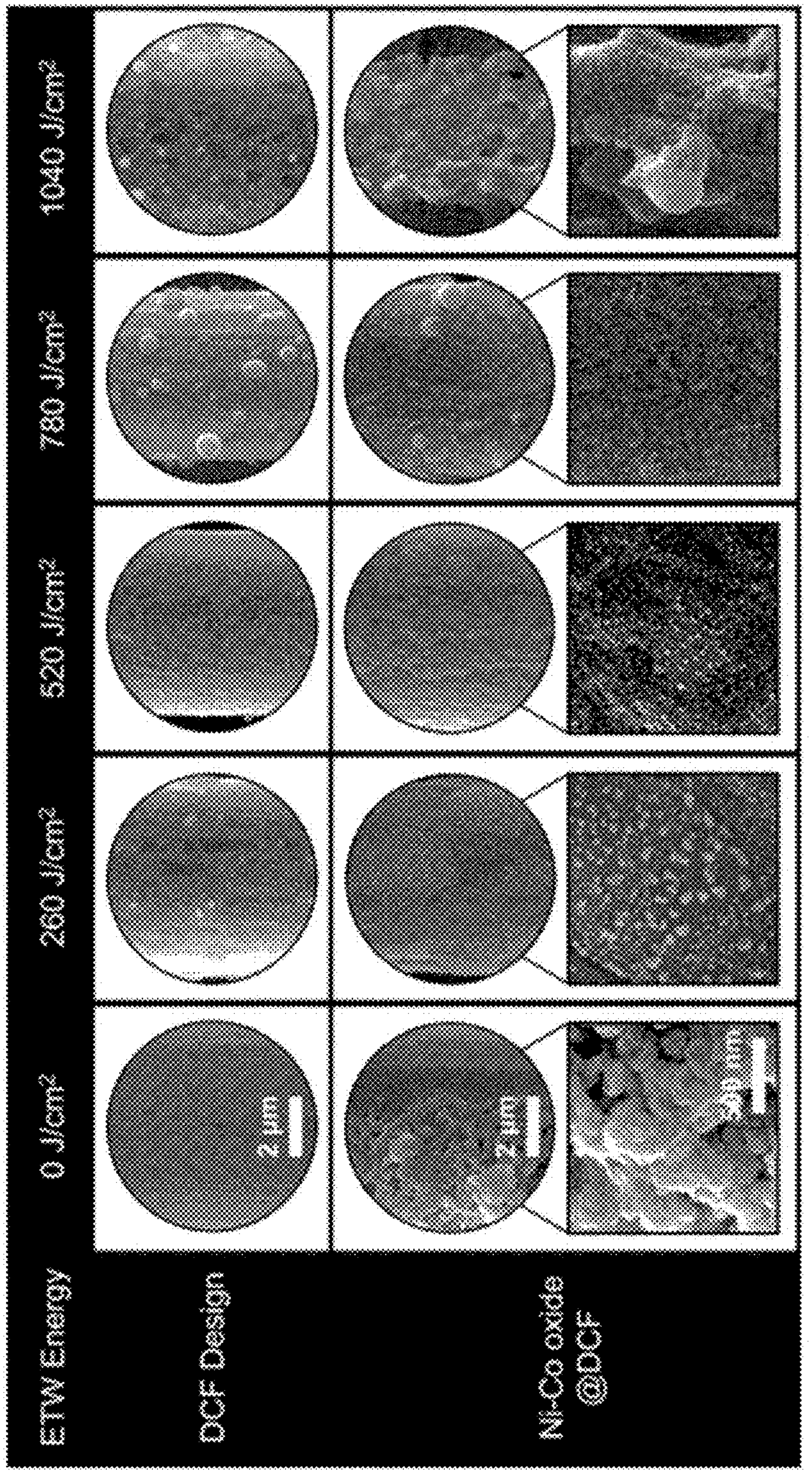
FIG. 6 is a surface shape of a carbon body and a surface shape of a composite according to an energy density injected in a process of inducing defects in a carbon body.

FIG. 6 is a surface shape of a carbon body and a surface shape of a composite according to an energy density injected in a process of inducing defects in a carbon body.

Referring to FIG. 6, it can be seen that depending on the energy density of electricity applied to induce defects in the carbon body, the surface shape of the carbon body and the surface shape of the composite are completely different from each other.

If no defects are induced in the carbon body, it can be seen that the surface of the carbon body is smooth, and that the metal oxide is excessively aggregated and formed at a specific location.

In comparison, if the energy density of electricity applied to induce defects in the carbon body is controlled to be 260 $J/cm^2$ to 780 $J/cm^2$, it can be seen that defects are evenly formed on the surface of the carbon body, and accordingly, the metal oxide is evenly dispersed and formed.

However, if the energy density of electricity applied to induce defects in the carbon body is greater than 780 $J/cm^2$, excessive defects are formed, and the metal oxides are not evenly formed.

The effect of defects induced in the carbon body on the shape of the composite attributes to the surface energy of a carbon substrate which affects the nucleation process when the metal oxide precursor solvent evaporates.

Figure 7:
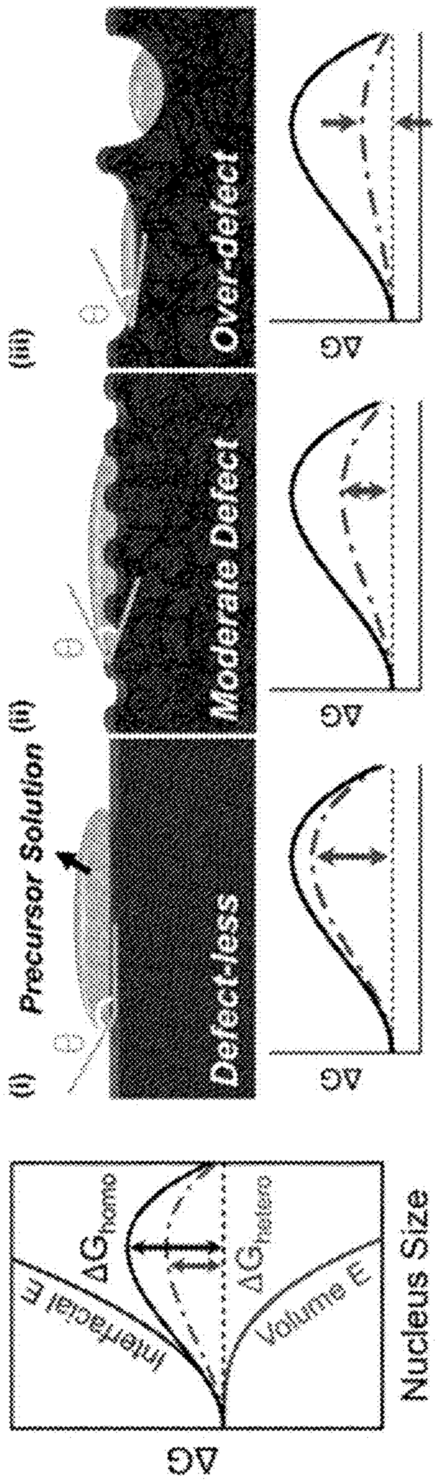
FIG. 7 is a schematic diagram for describing measuring a contact angle with respect to the surface of a carbon body of a metal oxide precursor solvent in order to confirm the effect of defects induced in the carbon body on the surface energy of the carbon body.
Figure 8:
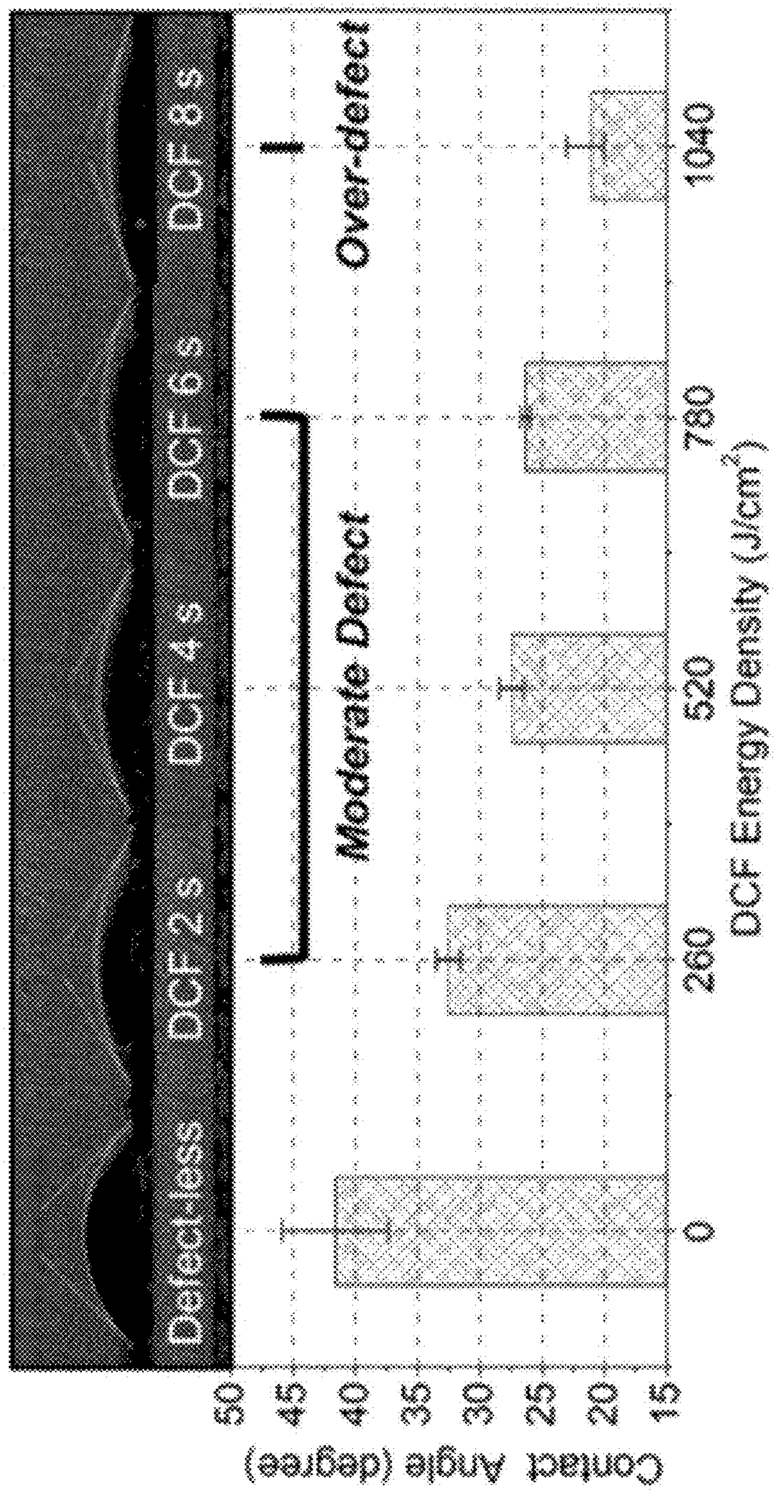
FIG. 8 shows the result of measuring a contact angle with respect to the surface of a carbon body of a metal oxide precursor solvent according to defects induced in the carbon body in a production process of a composite.
Figure 9:
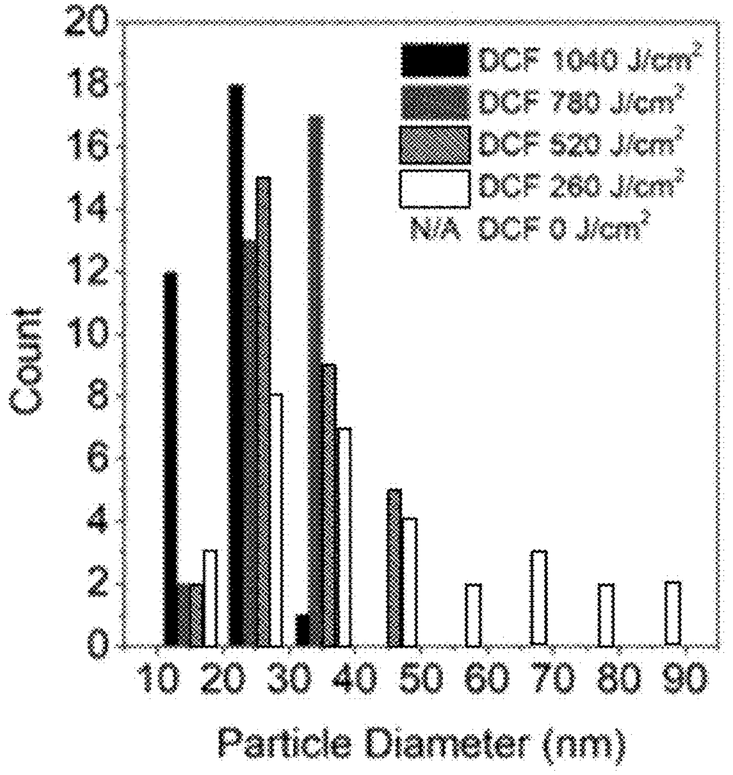
FIG. 9 shows the result of measuring the size of metal oxide particles according to defects induced in a carbon body in a production process of a composite.

FIG. 7 is a schematic diagram for describing measuring a contact angle with respect to the surface of a carbon body of a metal oxide precursor solvent in order to confirm the effect of defects induced in the carbon body on the surface energy of the carbon body, FIG. 8 shows the result of measuring a contact angle with respect to the surface of a carbon body of a metal oxide precursor solvent according to defects induced in the carbon body in a production process of a composite, and FIG. 9 shows the result of measuring the size of metal oxide particles according to defects induced in a carbon body in a production process of a composite.

Referring to FIGS. 7 and 8, in the case in which defects are properly induced in the carbon body, the contact angle of the metal oxide precursor solvent with respect to the surface of the carbon body is about 25 degrees to 35 degrees.

In the case in which no defects are induced in the carbon body, the contact angle of the metal oxide precursor solvent with respect to the carbon body surface was about 41.63 degrees. whereas the contact angle of the metal oxide precursor solvent with respect to the carbon body in which defects were induced by applying electricity with an energy density of about 260 $J/cm^2$ was 32.61 degrees, which is reduced by about 21.67%. Furthermore, the contact angle of the metal oxide precursor solvent with respect to the carbon body in which defect were induced by applying electricity with an energy density of 1,040 $J/cm^2$ was decreased to about 21.11 degrees. Accordingly, as can be seen in FIG. 9, the size of metal oxide particles according to defects induced in the carbon body varies. That is, since the contact angle of the metal oxide precursor solvent with respect to the carbon body varies due to defects induced in the metal carbon body, it can be seen that the defects induced in the carbon body affects the nucleation energy of the metal oxide.

Figure 10:
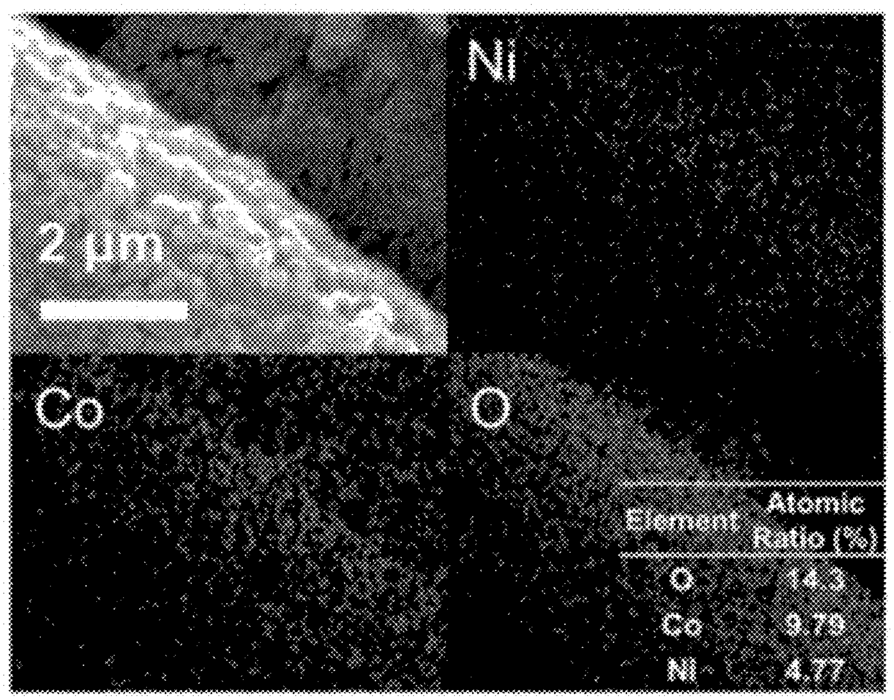
FIG. 10 shows the result of measuring the EDX of a composite.

FIG. 10 shows the result of measuring the EDX of a composite, and through the EDX, it was confirmed that components of the composite are composed of nickel, cobalt, and oxygen, wherein the ratio thereof represents a spinel crystal ($NiCo_2O_4$).

Figure 11:
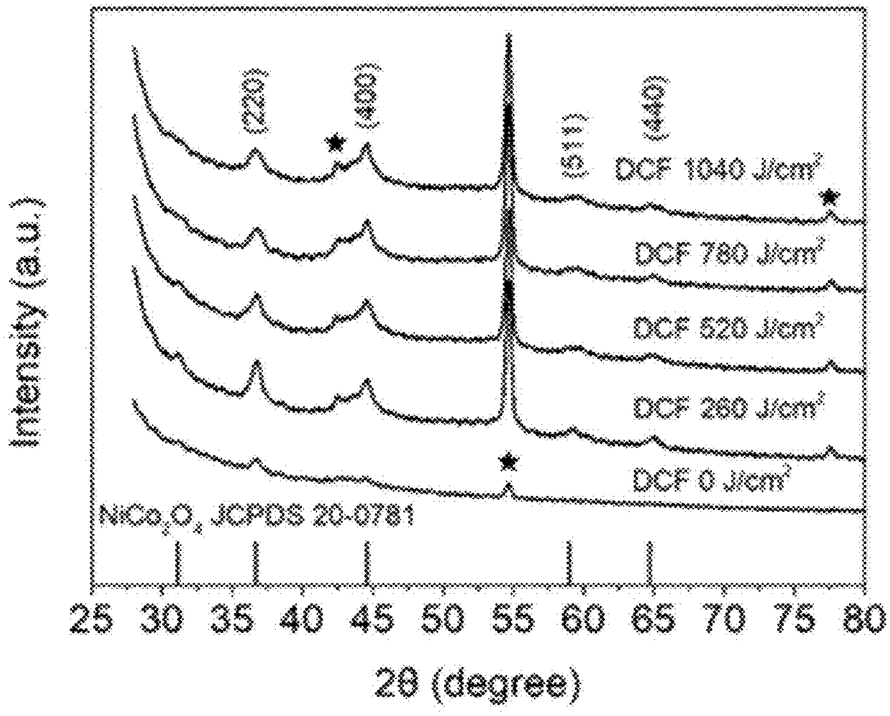
FIG. 11 shows the result of analyzing the XRD of a composite according to defects induced in a carbon body.

FIG. 11 shows the result of analyzing the XRD of a composite according to defects induced in a carbon body.

FIG. 11 shows that there is no significant difference in the crystal structure due to induced defects applied in the carbon substrate, but it has been confirmed that the crystallinity is improved when compared to a composite without an induced defect.

Figure 12:
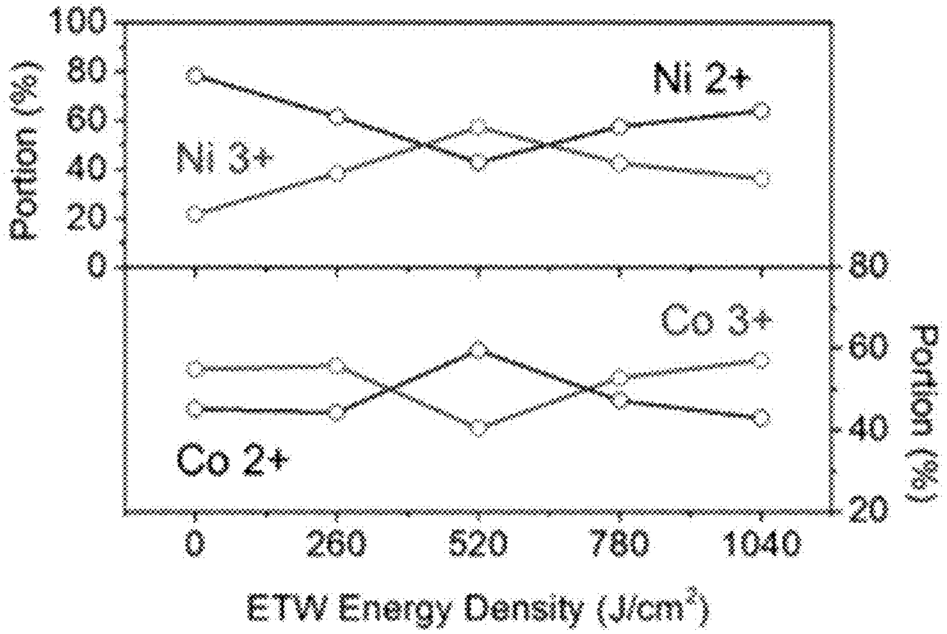
FIG. 12 shows the result of analyzing the X.PS of a complex according to defects induced in a carbon body.

FIG. 12 shows the result of analyzing the X.PS of a complex according to defects induced in a carbon body.

In the case of a nickel-cobalt oxide, the more the $Ni^{2+}$ and $Co^{3}$, the more stable the crystals, and referring to FIG. 12, it can be confirmed that composite in which defect are induced in the carbon body with an energy density of 520 $J/cm^2$ has the most stable crystals.

FIGS. 13A to 13F show the results of evaluating electrical properties of a supercapacitor using a composite of an embodiment as an electrode.

Figure 13A:
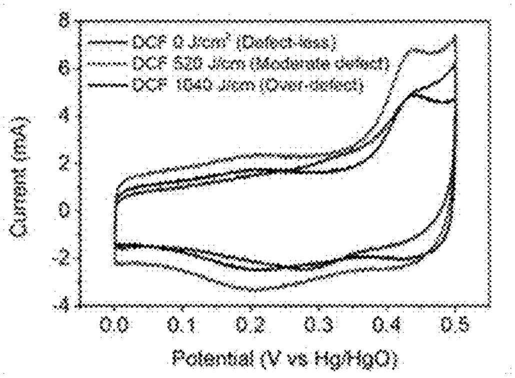
FIGS. 13A to 13F show the results of evaluating electrical properties of a supercapacitor using a composite of an embodiment as an electrode.

As can be seen in FIG. 13A, the result of the CV experiment shows that the redox reactivity differs according to the degree of defects induced in the carbon body, and that the best performance is achieved when an appropriate number of defects are induced in the composite.

Figure 13B:
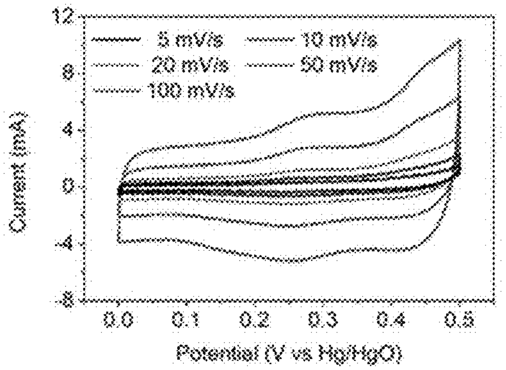

FIG. 13B shows the result of the CV experiment using, as an electrode, a composite in which defects are induced in a carbon body with an energy density of about 520 $J/cm^2$, the composite having the most stable crystals, and it has been confirmed that the supercapacitor has excellent performance at various scan rates.

Figure 13C:
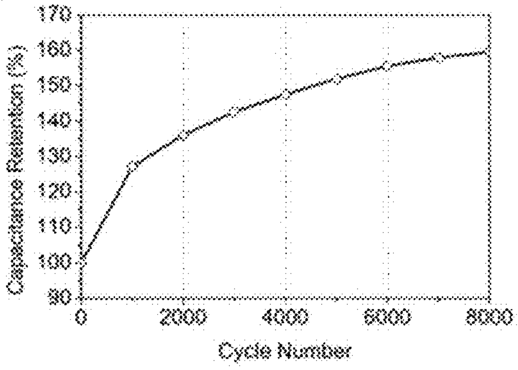
Figure 13D:
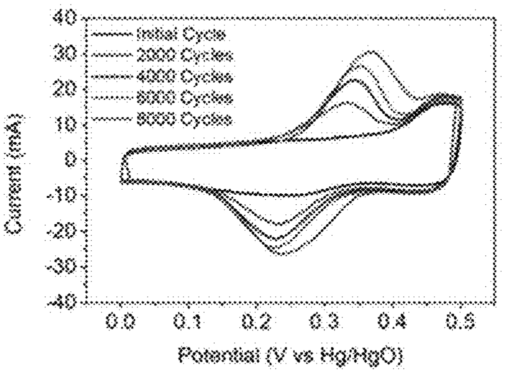

FIG. 13C and FIG. 13D show the results of the cycle experiment of a supercapacitor using, as an electrode, a composite in which defects are induced in a carbon body with an energy density of about 520 $J/cm^2$, the composite having the most stable crystals, and it can be seen that the capacitance increases as the cycle is repeatedly performed.

Figure 13E:
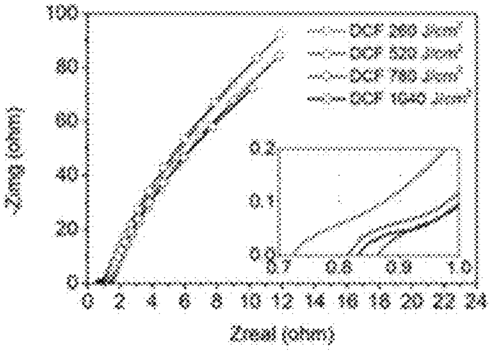
Figure 13F:
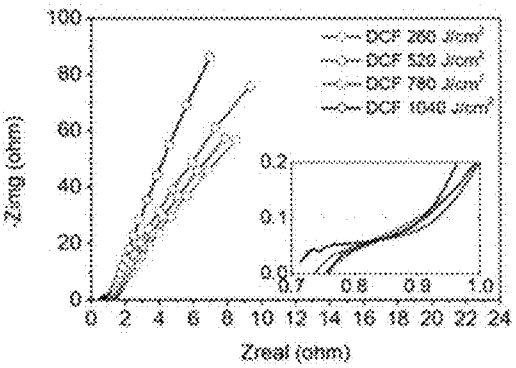

FIG. 13E and FIG. 13F are the results of the electrochemical impedance spectroscopy (EIS) experiment, which are respectively the experiment result after the initial cycle and after 8,000 cycles. The results confirm that the impedance of the electrode was reduced in both cases as charging and discharging were repeated.

Additional analysis was conducted to analyze the reason for improvement in the performance of the supercapacitor as charging and discharging were repeated, and the results are shown in FIGS. 14A to 14G. The additional analysis was performed on the composite in which defects were induced in the carbon body with an energy density of about 520 J/cm$^2$, the composite which had the best performance.

Figure 14A:
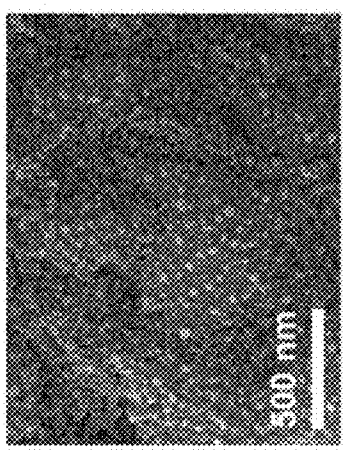
FIGS. 14A to 14G show the results of additional analysis in order to analyze the reason for improvement in the performance of a supercapacitor as charging and discharging are repeated.
Figure 14B:
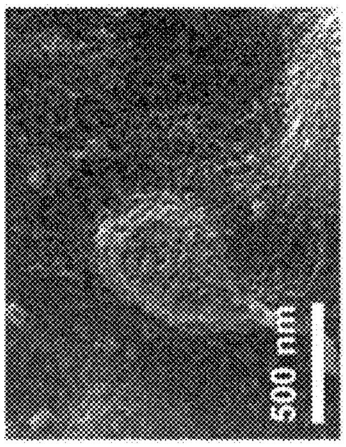
Figure 14C:
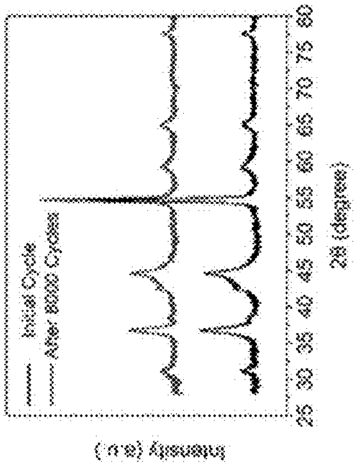
Figure 14D:
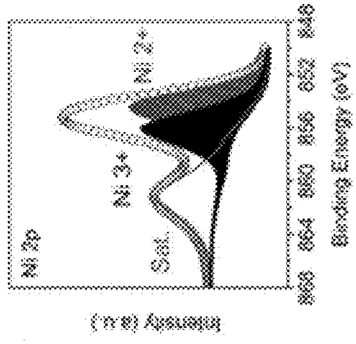
Figure 14E:
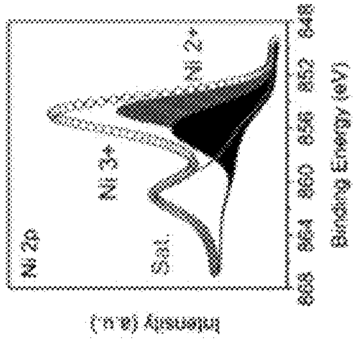
Figure 14F:
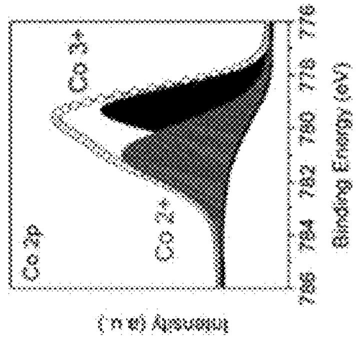
Figure 14G:
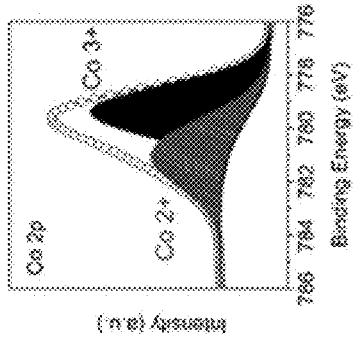

FIGS. 14A and 14B show the results of shape change through SEM images, which respectively show the results before and after the cycles. Through repeated charging and discharging processes, the metal oxide (active material) initially in a form in which small particles are embedded in the carbon body was changed into a pleated form to be more suitable for an electrochemical oxidation-reduction reaction.

Figure 15A:
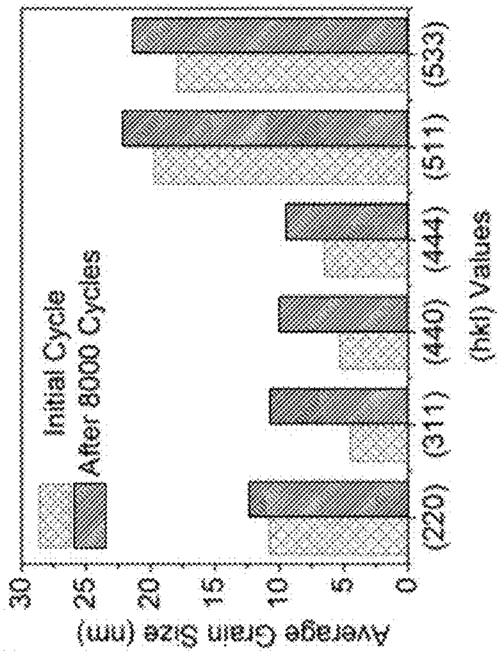
FIGS. 15A and 15B show the results of measuring a change in a grain size according to a charge/discharge cycle.
Figure 15B:
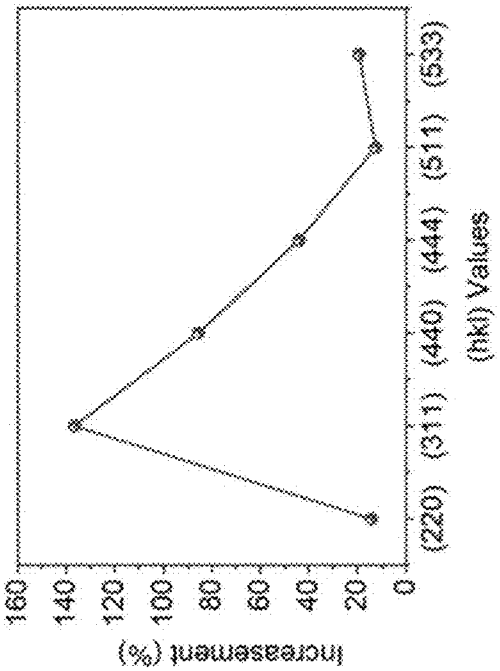

FIGS. 14C to 14G show the results of the XRD and XPS analysis to identify chemical changes. The XRD result showed that there was no chemical change in the crystals, but it was confirmed that the grain size was increased (see FIGS. 15A and 15B). The grain size is also related to resistance in an electrochemical reaction, and as the grain size decreases, the resistance of the composite decreases, resulting in better reactivity. In the XPS experiment result, it was confirmed that 2+ increased in Ni and 3+ increased in Co more stably through the repeated charging and discharging.

FIGS. 16A to 16E are results of measuring the performance of a composite as a supercapacitor electrode which is finally activated through 8000 charge/discharge cycles. The measurement of the performance of an activated composite as a supercapacitor electrode was performed on the composite in which defects were induced in the carbon body with an energy density of about 520 J/cm$^2$, the composite which had the best performance.

Figure 16A:
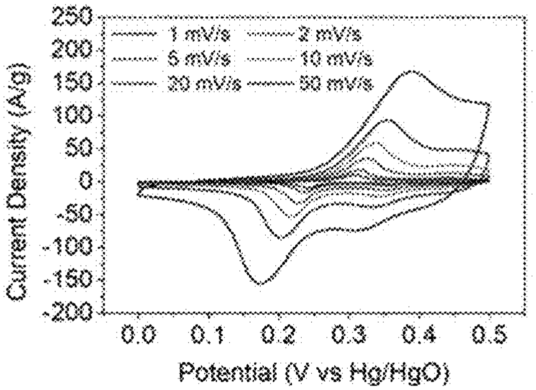
FIGS. 16A to 16E are results of measuring the performance of a composite as a supercapacitor electrode which is finally activated through 8000 charge/discharge cycles.
Figure 16B:
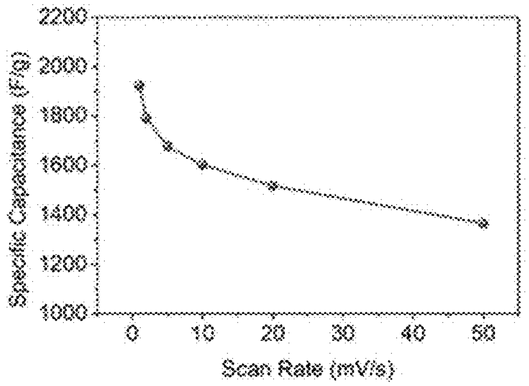
Figure 16C:
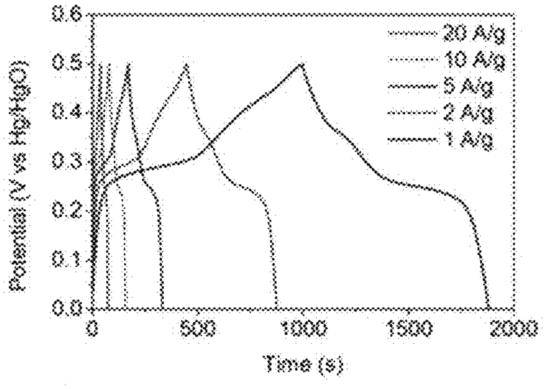
Figure 16D:
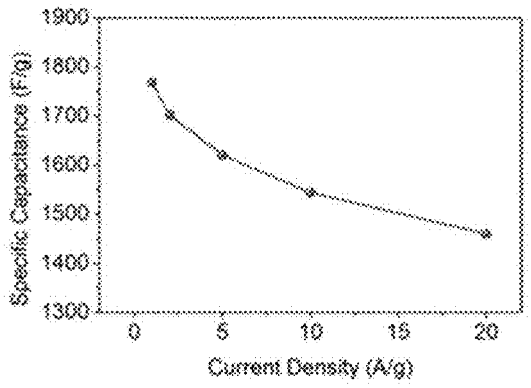
Figure 16E:
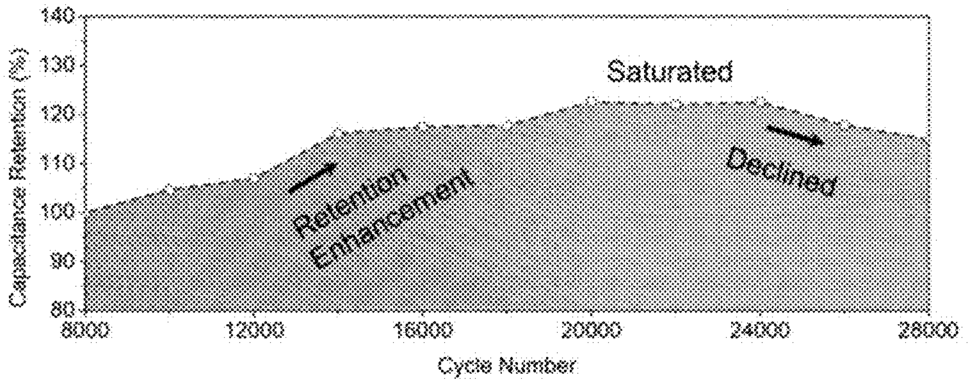

FIG. 16A shows the result of VC measurement at various scan rates, FIG. 16B shows the result of specific capacitance measurement at various scan rates, FIGS. 16C and 16D show the results of electrode performance evaluation by the Galvano static charge-discharge (GCD) experiment, and FIG. 16E shows the result of the GCD experiment after 20,000 cycles.

Referring to FIGS. 16A to 16E, it can be seen that a composite with a defect-induced carbon and a metal oxide has very good durability if used as an electrode, and also has a very high specific capacitance of about 1750 F/g at a current density of about 1 A/g.

The scope of protection of the present invention is not limited to the description and expression of the embodiments explicitly described above. In addition, it should be added once again that the scope of protection of the present invention may not be limited due to obvious changes or substitutions in the technical field to which the present invention pertains.

The invention claimed is:

1. A composite comprising a defect-induced carbon body and a metal oxide coupled to the carbon body, wherein the induced defect on the carbon body is a dimple or spherical protrusion formed on the surface thereof.

2. The composite of claim 1, wherein the metal oxide is a nickel-cobalt oxide.

3. The composite of claim 1, wherein the metal oxide is $NiCo_2O_4$.

4. The composite of claim 1, wherein in the carbon body, the contact angle of a precursor solvent of the metal oxide with respect to the surface of the carbon body is about 25 degrees to about 35 degrees due to the induced defect.

5. The composite of claim 1, wherein the metal oxide is coupled in the form of a protrusion formed by aggregation of a plurality of particle phases on the surface of the carbon body.

6. An energy storage device comprising, as an electrode, a composite including a defect-induced carbon body and a metal oxide coupled to the carbon body, wherein the induced defect on the carbon body is a dimple or spherical protrusion formed on the surface thereof.

7. A method for producing a composite including a defect-induced carbon body and a metal oxide coupled to the carbon body, the method comprising the steps of:

(a) inducing defects in a carbon body through a Joule-heating process;

(b) contacting the defect-induced carbon body with a solution containing a metal oxide precursor; and (c) applying heat to the carbon body in contact with the metal oxide precursor to decompose the precursor, and synthesizing a metal oxide.

8. The method of claim 7, wherein the Joule-heating process of the step (a) is performed by applying electricity of about 260 J/cm$^2$ to about 780 J/cm$^2$ to the carbon body.

9. The method of claim 7, wherein the metal oxide precursor solution is a solution in that a nickel nitrate and a cobalt nitrate are dissolved in a solvent.

10. The method of claim 7, wherein the step (c) is performed by a Joule-heating process, and performed by applying electricity of about 25 J/cm$^2$ to about 50 J/cm$^2$.

* * * * *